United States Patent [19]
Phillion et al.

[11] Patent Number: 5,906,390
[45] Date of Patent: May 25, 1999

[54] VEHICLE OCCUPANT PROTECTION APPARATUS

[75] Inventors: Robert I. Phillion, Ray Township; Edward F. Elmer, Auburn Hills; Robert F. McGee, Clawson; John P. Wallner, Rochester; Bonnie L. Maier, Capac; Michael Akins, Oakland, all of Mich.

[73] Assignee: TRW Vehicle Safety Systems Inc., Lyndhurst, Ohio

[21] Appl. No.: 08/858,610

[22] Filed: May 19, 1997

[51] Int. Cl.[6] .................................................. B60R 21/22
[52] U.S. Cl. ..................................... 280/728.3; 280/730.2
[58] Field of Search ................................ 280/732, 730.2, 280/730.1, 728.3

[56] References Cited

U.S. PATENT DOCUMENTS

| | | |
|---|---|---|
| 4,327,937 | 5/1982 | Scholz et al. ......................... 280/728.3 |
| 5,112,079 | 5/1992 | Haland et al. . |
| 5,116,079 | 5/1992 | Rhodes, Jr. . |
| 5,308,112 | 5/1994 | Hill et al. . |
| 5,316,336 | 5/1994 | Taguchi et al. . |
| 5,335,937 | 8/1994 | Uphues et al. . |
| 5,340,151 | 8/1994 | Sato . |
| 5,431,435 | 7/1995 | Wilson . |
| 5,498,027 | 3/1996 | Kelley et al. . |
| 5,536,038 | 7/1996 | Bollaert et al. . |
| 5,542,696 | 8/1996 | Steffens, Jr. et al. . |
| 5,590,903 | 1/1997 | Phillion et al. . |
| 5,601,332 | 2/1997 | Schultz et al. ......................... 280/730.2 |
| 5,676,394 | 10/1997 | Maly ..................................... 280/730.2 |
| 5,683,101 | 11/1997 | Davis et al. ........................... 280/730.2 |
| 5,690,354 | 11/1997 | Logan et al. .......................... 280/730.2 |

*Primary Examiner*—Paul N. Dickson
*Attorney, Agent, or Firm*—Tarolli, Sundheim, Covell, Tummino & Szabo

[57] ABSTRACT

An apparatus (10) includes a vehicle part (16) with a structural portion (44) and a trim portion (50) covering the structural portion (44). An air bag module (30) is located within a deployment opening (56) in the trim portion (50) of the vehicle part (16). A deployment structure (70) closes the deployment opening (56). The deployment structure (70) consists of a single, continuous body of molded plastic material, and includes a deployment door (78 or 80) partially bounded by a stress riser (82) in the plastic material. The module (30) is mounted on the structural portion (44) of the vehicle part (16). The deployment structure (70) is fully supported on the vehicle part (16) by the trim portion (50) separately from the module (30) and the structural portion (44).

9 Claims, 3 Drawing Sheets

VEHICLE OCCUPANT PROTECTION APPARATUS

FIELD OF THE INVENTION

The present invention relates to an inflatable vehicle occupant protection device, and particularly relates to a deployment structure for covering the protection device.

BACKGROUND OF THE INVENTION

An inflatable vehicle occupant protection device, such as an air bag, is inflated when a vehicle experiences a crash. Inflation fluid is then directed to flow from an inflator into the air bag to inflate the air bag. When the air bag is inflated, it extends into the vehicle occupant compartment to protect an occupant of the vehicle from a forceful impact with parts of the vehicle as a result of the crash.

In certain vehicle installations, an air bag is inflated when a vehicle experiences a side impact crash, such as a crash in which an impact is directed against a door at the side of the vehicle. A side impact crash can cause the door to intrude toward the middle of the vehicle. The air bag is inflated into the vehicle occupant compartment between the door and an occupant of a seat adjacent to the door. The inflated air bag can then protect the occupant from a forceful impact with the door.

An air bag and an inflator are typically installed in a vehicle as parts of an air bag module. The module is an assembly of parts that are interconnected separately from the vehicle. For a side impact installation, the module may be mounted on the frame of the seat or on a structural panel in the adjacent door. If the module is mounted on the frame of the seat, the inflating air bag emerges from the seat and moves into the vehicle occupant compartment by breaking through a seat cushion that covers the frame. If the module is mounted on a structural panel in the door, the inflating air bag emerges from the door and moves into the vehicle occupant compartment by breaking through a trim panel that covers the structural panel. A door-mounted module may alternatively include a rupturable cover which extends across an opening in the trim panel. The module cover closes the opening in the trim panel effectively as a rupturable portion of the trim panel.

SUMMARY OF THE INVENTION

The present invention relates to an apparatus comprising a vehicle part with a structural portion and a trim portion covering the structural portion. The trim portion of the vehicle part has a deployment opening. The apparatus further comprises a module having a plurality of parts, including an inflatable vehicle occupant protection device, which are interconnected separately from the vehicle part. The module is located within the deployment opening in the trim portion of the vehicle part. A deployment structure closes the deployment opening.

In accordance with a principal feature of the present invention, the deployment structure consists of a single continuous body of molded plastic material, and includes a deployment door which is partially bounded by a rupturable stress riser in the plastic material. The module is mounted on the structural portion of the vehicle part. The deployment structure is fully supported on the vehicle part by the trim portion separately from the module and the structural portion.

In accordance with another principal feature of the present invention, the deployment structure has a peripheral portion surrounding the deployment door and the stress riser. The peripheral portion of the deployment structure is permanently fastened directly to the trim portion of the vehicle part by a bond extending entirely around the deployment opening. The bond in a first embodiment is formed by stitches. In a second embodiment, the trim portion of the vehicle part is partially embedded in the plastic material of the deployment structure. The bond in the second embodiment is thus formed by the plastic material.

In each of the preferred embodiments of the present invention, the vehicle part is a seat. The structural portion of the vehicle part is the seat frame. The trim portion of the vehicle part is the seat cushion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
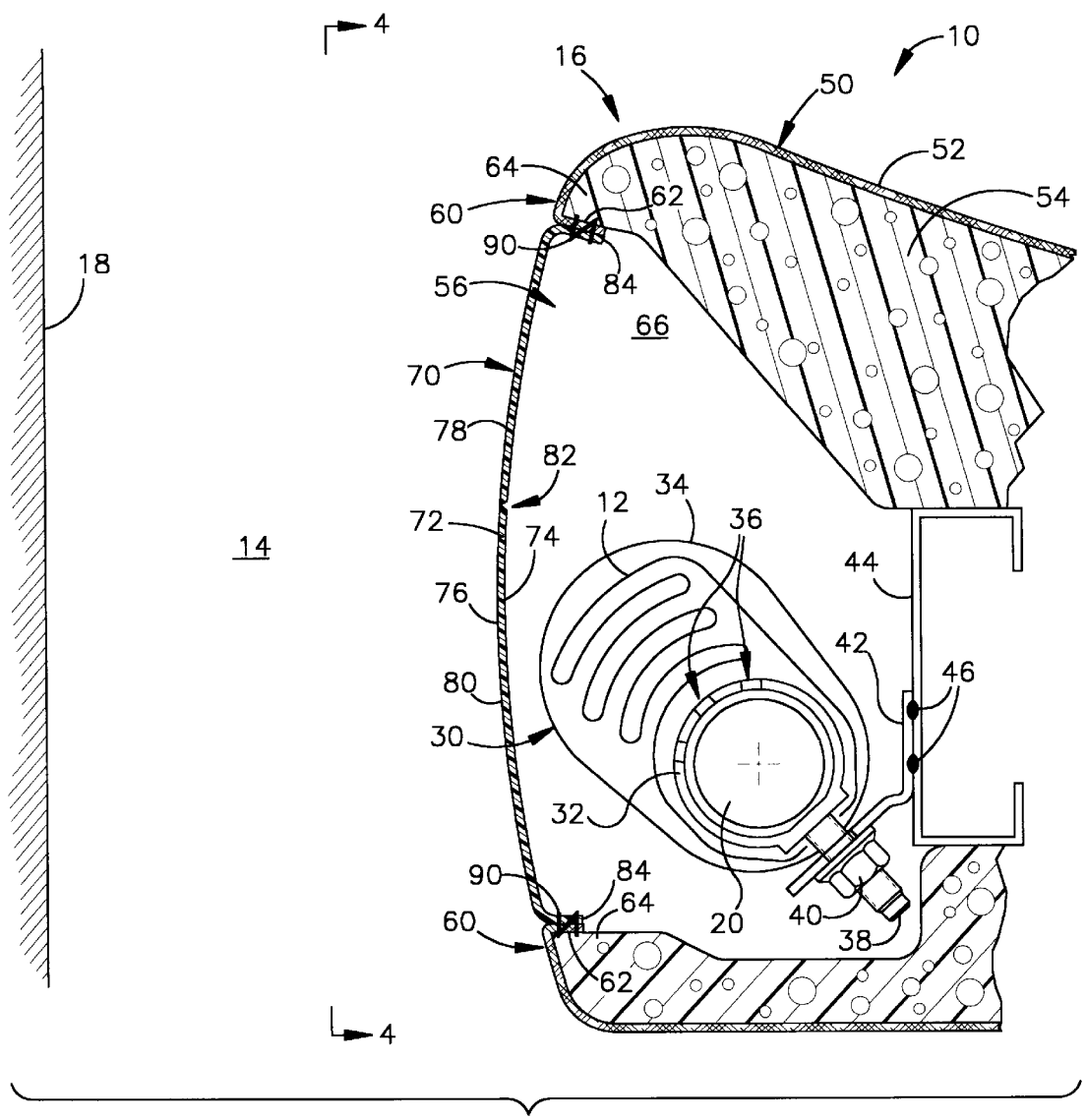
FIG. 1 is a schematic view of an apparatus comprising a first embodiment of the present invention.

An apparatus 10 comprising a first embodiment of the present invention is shown partially in the schematic view of FIG. 1. The apparatus 10 includes a particular type of inflatable vehicle occupant protection device 12 which is known as an air bag. The air bag 12 is inflatable from an uninflated condition, as shown in FIG. 1, to an inflated condition, as shown partially in FIG. 2. When the air bag 12 is in the inflated condition of FIG. 2, it extends into the vehicle occupant compartment 14 between a vehicle seat 16 and an adjacent door 18 at the side of the vehicle.

The apparatus 10 further includes an inflator 20 comprising a source of inflation fluid for inflating the air bag 12. As known in the art, the inflator 20 may contain ignitable gas generating material for generating a large volume of inflation gas. The inflator 20 may alternatively contain a stored quantity of pressurized inflation fluid, or a combination of pressurized inflation fluid and ignitable material for heating the inflation fluid.

Figure 2:
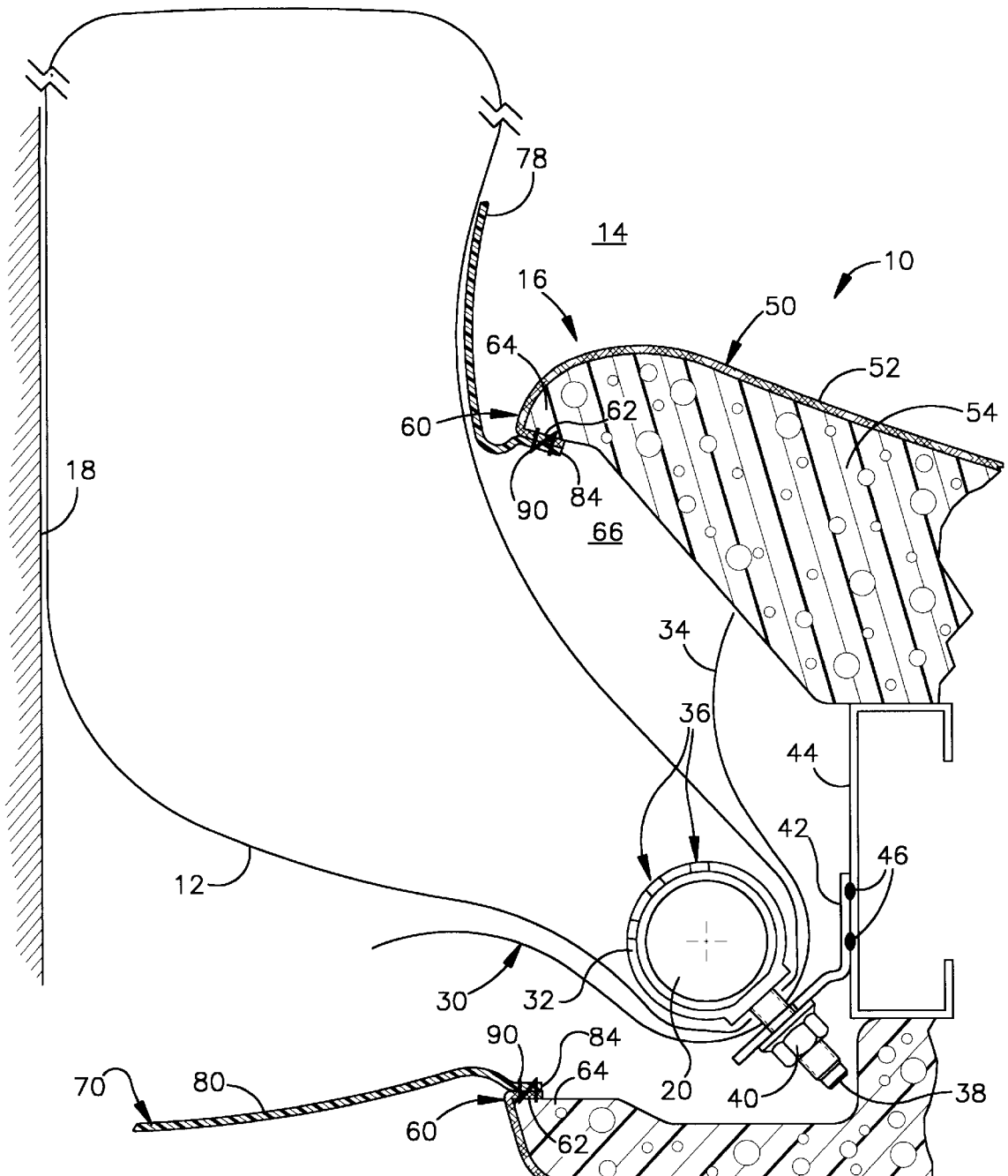
FIG. 2 is a view similar to FIG. 1 showing parts in different positions.
Figure 3:
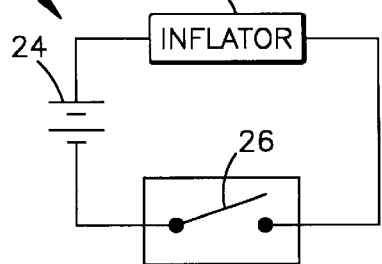
FIG. 3 is a schematic view of an electrical circuit including a part of the apparatus of FIG. 1.

As shown schematically in FIG. 3, the inflator 20 is included in an electrical circuit 22 with a power source 24 and a normally open switch 26. The power source 24 is preferably the vehicle battery and/or a capacitor. The switch 26 is part of a sensor 28 which senses a condition indicating the occurrence of a vehicle crash. In the first embodiment of the present invention shown in the drawings, the inflator 20 is actuated upon the occurrence of a side impact vehicle crash. In a side impact vehicle crash, an impact is directed against the vehicle in a direction extending across the vehicle between the door 18 and the seat 16, i.e., in a direction extending from side-to-side in the schematic views of FIGS. 1 and 2. Accordingly, the crash-indicating condition sensed by the sensor 28 may comprise, for example, sudden transverse vehicle acceleration or crushing of the door 18 or another side portion of the vehicle.

If the crash-indicating condition sensed by the sensor 28 is at or above a predetermined threshold level, it indicates the occurrence of a side impact crash having at least a predetermined threshold level of severity. The threshold level of crash severity is a level at which inflation of the air bag 12 is desired to help protect an occupant of the seat 16. The switch 26 then closes and electric current is directed to the inflator 20 to actuate the inflator 20. The inflator 20 then emits a large volume of inflation fluid which flows into the air bag 12 to inflate the air bag 12.

As further shown schematically in FIGS. 1 and 2, the air bag 12 and the inflator 20 are parts of an air bag module 30. The module 30 is an assembly of parts that are interconnected separately from the vehicle seat 16. In addition to the air bag 12 and the inflator 20, the interconnected parts of the module 30 include a diffuser 32, and preferably include a protective enclosure 34. The diffuser 32 has a plurality of inflation fluid openings 36 for directing inflation fluid from the inflator 20 to the air bag 12. The protective enclosure 34 is formed of plastic material which is rupturable under the influence of the inflating air bag 12, as shown in FIG. 2. Each of the foregoing parts 12, 20, 32 and 34 of the module 30 may have any suitable structure known in the art. For example, the protective enclosure 34 may have a clam-shell configuration in accordance with the invention set forth in co-pending U.S. patent application Ser. No. 08/626,480, filed Apr. 2, 1996, entitled "Seat Mounted Air Bag Module," and assigned to the assignee of the present application.

A plurality of mounting studs 38, one of which is shown in FIGS. 1 and 2, project from the diffuser 32. The mounting studs 38 and a corresponding plurality of nuts 40 fasten the module 30 to a mounting bracket 42. The mounting bracket 42 is fastened to the frame 44 of the seat 16 by welds 46. The frame 44 may be either the seat back frame or the seat bottom frame.

Figure 4:
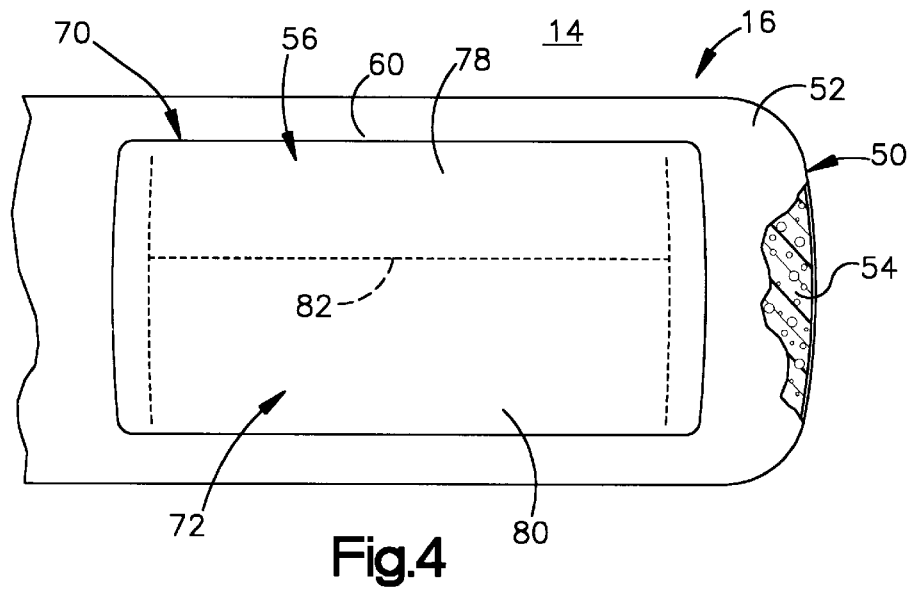
FIG. 4 is a view taken on line 4—4 of FIG. 1.

A seat cushion 50 covers the frame 44. The seat cushion 50 includes a cover layer 52 on a compressible base 54. The cover layer 52 is preferably formed of fabric or leather. The base 54 is preferably formed of elastomeric foam. The cover layer 52 and the base 54 together define a deployment opening 56 at the side of the seat cushion 50 facing the door 18. More specifically, the seat cushion 50 has an edge portion 60 defined by adjoining, co-extensive edge portions 62 and 64 of the cover layer 52 and the base 54. The edge portion 60 of the seat cushion 50 extends continuously around the deployment opening 56 so as to define the perimeter and the peripheral shape of the deployment opening 56. Although the deployment opening 56 has a generally rectangular peripheral shape, as shown in FIG. 4, it could alternatively have any other suitable peripheral shape. The seat cushion 50 further defines a cavity 66 extending inward from the deployment opening 56 to the frame 44. The air bag module 30 is received in the cavity 66, and is mounted on the frame 44 within the cavity 66 in the manner described above.

Figure 5:
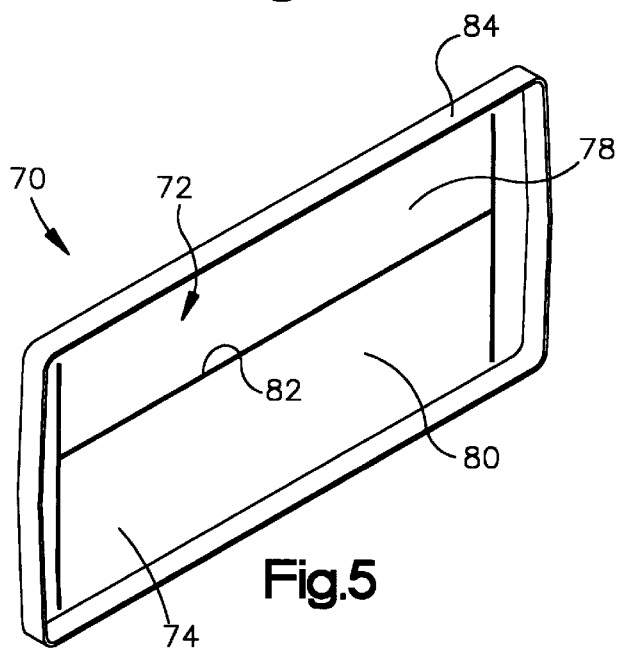
FIG. 5 is a perspective of a part of the apparatus of FIG. 1.

A deployment structure 70 closes the deployment opening 56. The deployment structure 70 in the first embodiment of the present invention is a unitary part consisting of a single, continuous body of molded plastic material. A generally rectangular panel portion 72 of the deployment structure 70 has inner and outer side surfaces 74 and 76, and includes a pair of rectangular deployment doors 78 and 80. Each of the deployment doors 78 and 80 is bounded on three sides by an elongated notch 82 (FIG. 5) extending across the inner side surface 74 in a generally H-shaped configuration. The notch 82 defines a co-extensive stress riser which is rupturable under the influence of the inflating air bag 12, as described below.

A mounting flange 84 on the deployment structure 70 projects inward from the panel 72, and extends continuously around the periphery of the panel 72. The peripheral size and shape of the deployment structure 70 at the mounting flange 84 closely match the peripheral size and shape of the deployment opening 56 in the seat cushion 50. Accordingly, the deployment structure 70 fits closely within the deployment opening 56, as shown in FIGS. 1, 2 and 4, with the mounting flange 84 adjoining the surrounding edge portion 60 of the seat cushion 50 entirely around the deployment opening 56.

A row of stitching 90 fastens the mounting flange 84 directly to the edge portion 62 of the cover layer 52. The stitching 90 extends continuously around the edge portion 60 of the seat cushion 50 to form a continuous peripheral bond at which the deployment structure 70 is permanently fastened to the seat cushion 50 entirely around the deployment opening 56. A continuous peripheral bond could alternatively be defined by another continuous fastening structure, such as an adhesive, rather than the stitching 90. In this arrangement, the seat cushion 50 fully supports the deployment structure 70 on the seat 16 separately from the module 30 and the frame 44.

When the air bag 12 is inflated, as described above, it ruptures and emerges from the protective enclosure 34, and then moves outward against the panel portion 72 of the deployment structure 70. The stress riser at the notch 82 (but not the bond at the stitching 90) ruptures under stress induced by the inflation fluid pressure in the air bag 12. The deployment doors 78 and 80 are then released to deflect pivotally open as the inflating air bag 12 emerges from the cavity 66 and moves outward into the vehicle occupant compartment 14, as shown in FIG. 2.

Figure 6:
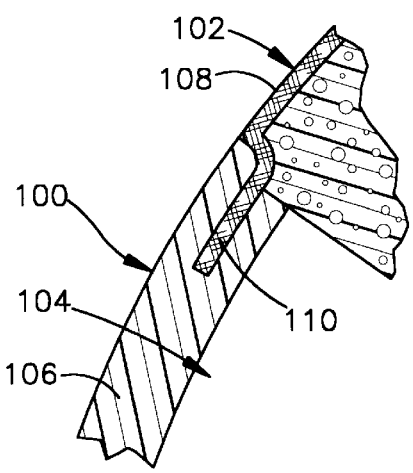
FIG. 6 is a partial view of an apparatus comprising a second embodiment of the present invention.

A second embodiment of the present invention is shown partially in FIG. 6. Like the first embodiment, the second embodiment includes a deployment structure 100 which is supported by a seat cushion 102 fully and separately from the seat frame and a corresponding air bag module (not shown). The deployment structure 100 closes a deployment opening 104 in the seat cushion 102, and is fastened to the seat cushion 102 continuously around the deployment opening 104.

The deployment structure 100 comprises a panel 106 with a pair of deployment doors (not shown) like the deployment doors 78 and 80 described above. However, the deployment structure 100 does not have a peripheral mounting flange like the mounting flange 84 described above. Instead, a cover layer 108 on the seat cushion 102 has an edge portion 110 embedded in the panel 106 continuously around the periphery of the panel 106. This is preferably accomplished in an insert molding process such that the plastic material of the panel 106 impregnates the edge portion 110 of the cover layer 108. The plastic material of the panel 106 thus forms a continuous peripheral bond at which the deployment structure 100 is permanently fastened directly to the seat cushion 102 entirely around the deployment opening 104.

From the above description of the invention, those skilled in the art will perceive improvements, changes and modifications. For example, a deployment structure constructed in accordance with the present invention could have a different number and/or configuration of deployment doors.

In particular, the deployment structure may have only a single deployment door defined by a notch 82 that has a semicircular shape or a U-shape. With such an arrangement, the ends of the notch 82 would be located rearwardly of, or below, the rounded portion of the notch to help direct the air bag in a particular direction when inflating. Such improvements, changes and modifications within the skill of the art are intended to be covered by the appended claims.

Having described the invention, the following is claimed:

1. Apparatus comprising:

a vehicle part having a structural portion and a trim portion covering said structural portion, said trim portion of said vehicle part having a deployment opening;

a module comprising a plurality of parts which are interconnected separately from said vehicle part, said module being located within said deployment opening and including an inflatable vehicle occupant protection device; and a deployment structure closing said deployment opening, said deployment structure consisting of a single, continuous body of molded plastic material and including a deployment door partially bounded by a rupturable stress riser in said plastic material;

said module being mounted on said structural portion of said vehicle part, said deployment structure being fully supported on said vehicle part by said trim portion separately from said module and said structural portion;

said deployment structure having a peripheral portion surrounding said deployment door and said stress riser, said peripheral portion of said deployment structure being permanently fastened directly to said trim portion of said vehicle part;

said trim portion of said vehicle part being partially embedded in said peripheral portion of said deployment structure.

2. Apparatus comprising:

a vehicle part having a structural portion and a trim portion covering said structural portion, said trim portion of said vehicle part having a deployment opening;

a module comprising a plurality of parts which are interconnected separately from said vehicle part, said module being located within said deployment opening and including an inflatable vehicle occupant protection device; and a deployment structure closing said deployment opening, said deployment structure consisting of a single, continuous body of molded plastic material and including a deployment door partially bounded by a rupturable stress riser in said plastic material;

said module being mounted on said structural portion of said vehicle part, said deployment structure being fully supported on said vehicle part by said trim portion separately from said module and said structural portion;

said deployment structure having a peripheral portion surrounding said deployment door and said stress riser, said peripheral portion of said deployment structure being permanently fastened directly to said trim portion of said vehicle part;

said peripheral portion of said deployment structure comprising a mounting flange projecting inward of said deployment opening.

3. Apparatus comprising:

a vehicle part having a structural portion and a trim portion covering said structural portion, said trim portion of said vehicle part having a deployment opening;

an inflatable vehicle occupant protection device mounted on said structural portion of said vehicle part at a location within said deployment opening; and a one piece deployment structure closing said deployment opening, said deployment structure including a deployment door partially bounded by a rupturable stress riser in said deployment structure;

said deployment structure further including a peripheral portion surrounding said deployment door and said stress riser, said peripheral portion of said deployment structure being permanently fastened directly to said trim portion of said vehicle part by a bond extending entirely around said deployment opening;

said deployment structure having a panel portion which includes said deployment door, said peripheral portion of said deployment structure comprising a mounting flange projecting inward of said deployment opening.

4. Apparatus as defined in claim 3 wherein said bond is defined by stitches.

5. Apparatus comprising:

a vehicle part having a structural portion and a trim portion covering said structural portion, said trim portion of said vehicle part having a deployment opening;

an inflatable vehicle occupant protection device mounted on said structural portion of said vehicle part at a location within said deployment opening; and a deployment structure closing said deployment opening, said deployment structure including a deployment door partially bounded by a rupturable stress riser in said deployment structure;

said deployment structure having a peripheral portion surrounding said deployment door and said stress riser, said peripheral portion of said deployment structure being permanently fastened directly to said trim portion of said vehicle part by a bond extending entirely around said deployment opening;

said peripheral portion of said deployment structure being formed of molded plastic material, said trim portion of said vehicle part being partially embedded in said plastic material with said bond being formed by said plastic material.

6. Apparatus as defined in claim 2 wherein said mounting flange is fastened directly to said trim portion of said vehicle part by a bond extending entirely around said deployment opening.

7. Apparatus as defined in claim 6 wherein said bond is formed by stitches.

8. Apparatus comprising:

a vehicle part having a structural portion and a trim portion covering said structural portion, said trim portion of said vehicle part including a base and a cover layer covering said base, said cover layer and said base together defining a deployment opening;

a module comprising a plurality of parts which are interconnected separately from said vehicle part, said module being located within said deployment opening and including an inflatable vehicle occupant protection device; and a deployment structure closing said deployment opening, said deployment structure including a deployment door partially bounded by a rupturable stress riser in said deployment structure;

said module being mounted on said structural portion of said vehicle part, said deployment structure being fully supported on said vehicle part by said cover layer separately from said module and said structural portion;

said deployment structure having a peripheral portion surrounding said deployment door and said stress riser, said peripheral portion being permanently fastened directly to said cover layer by a bond extending entirely around said deployment opening;

said peripheral portion of said deployment structure being formed of molded plastic material, said cover layer being partially embedded in said plastic material with said bond being formed by said plastic material.

9. Apparatus comprising:

a vehicle seat including a frame and a cushion covering said frame, said cushion having a deployment opening;

a module comprising a plurality of parts which are interconnected separately from said seat, said module being located within said deployment opening and including an inflatable occupant protection device; and a deployment structure closing said deployment opening;

said module being mounted on said frame, said deployment structure being fully supported on said seat by said cushion separately from said module and said frame;

said deployment structure having a peripheral portion permanently fastened directly to said cushion by a bond extending entirely around said deployment opening;

said peripheral portion of said deployment structure being formed of molded plastic material, said cover layer being partially embedded in said plastic material with said bond being formed by said plastic material.

* * * * *